March 8, 1966   J. D. I. LOCKE   3,239,740
MECHANISED DISPLAY PANELS
Filed Nov. 29, 1962   2 Sheets-Sheet 1

INVENTOR
JOHN D. I. LOCKE

BY *Larson and Taylor*

ATTORNEYS

United States Patent Office 3,239,740
Patented Mar. 8, 1966

3,239,740
MECHANISED DISPLAY PANELS
John David Ivor Locke, Southsea, England, assignor to Communications Patents Limited, London, England
Filed Nov. 29, 1962, Ser. No. 240,968
Claims priority, application Great Britain, Feb. 1, 1962,
3,901/62
6 Claims. (Cl. 318—267)

This invention relates to mechanised display panels such as are used in classroom training aids and in particular to actuating means for the operaion of a movable part of such display panels.

Instruction in the operation of complex mechanical systems, for example, the mechanical systems of an aircraft, can best be given by the use of classroom training aids which are self-explanatory diagrammatic working models of the aircraft system concerned, arranged on a display panel so that it can be used for class or group instruction.

Examples of such system trainers are diagrammatic working models of the hydraulic power systems of an aircraft, the landing gear of an aircraft, and the aileron and spoiler system of an aircraft.

The display panel may incorporate back-lighting in a plurality of compartments or cells on the rear surface of the panel, to enable selected areas of the panel to be illuminated to represent different operating conditions. For example, lines and areas representing parts of a hydraulic system may be distinctively illuminated to show the flow of fluid in the system. Means for providing back-lighting of a display panel is described in my copending U.S. application No. 206,807 filed on the 2nd of July 1962.

In some systems, it is necessary to provide several movable parts and to show movements of various kinds of these parts. Separate actuators must therefore be used for each part. The actuators must be located at the back of the panel to avoid interfering with the appearance of the display, preferably at positions close to the parts to be actuated, so that simple mechanical couplings may be used between the movable parts and the actuators.

In back-lighted display panels, it is desirable that an actuator should be accommodated within one cell of the panel, so that the layout of the lines and areas of the diagram is not restricted unnecessarily.

It is an object of the present invention to provide an improved actuating device for the operation of movable parts of a mechanised display panel.

Figure 1:
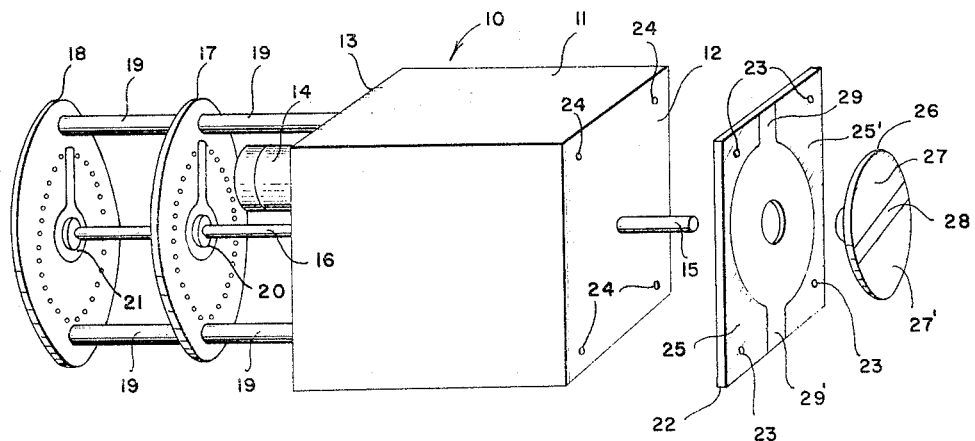
Figure 2:
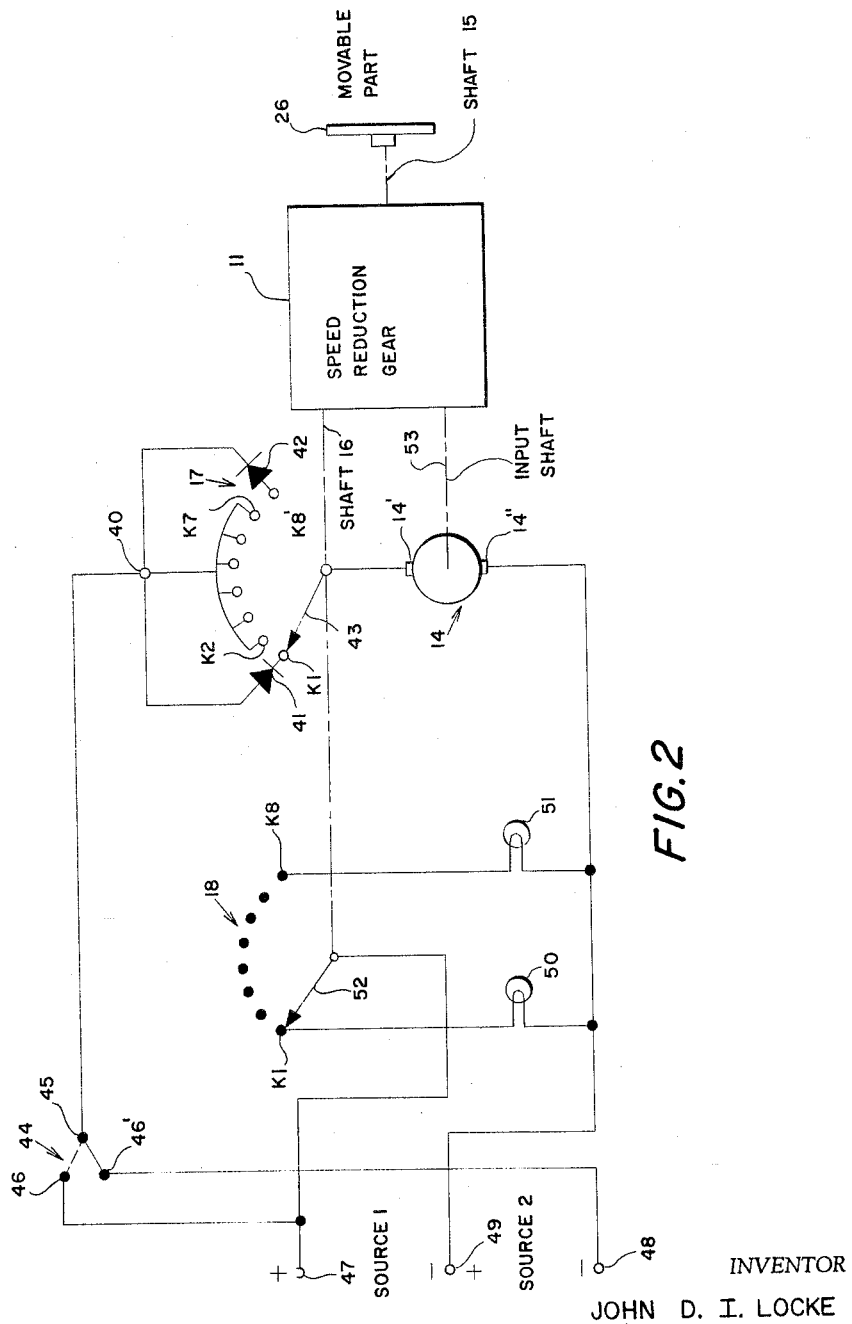

In order that the invention may be readily carried into effect, one embodiment thereof will now be described in detail, by way of example, with reference to the accompanying drawings, in which:

FIG. 1 is a perspective drawing of an actuating device, adapted to provide rotary motion to a movable part of a mechanised display panel, as seen from a viewpoint to one side and to one end of the device; and FIG. 2 is a circuit diagram of the actuating device of FIG. 1.

Referring to FIG. 1, an actuating device shown generally at 10 has a body 11, with square end faces 12 and 13 of dimensions to permit the body to be located within a compartment of a display panel of the type providing selective lighting of areas of the screen of the panel. In a panel of this type, the screen has a cellular grid attached thereto to define a large number of open-ended cells or compartments. In this example, the cells are cubical and the edges of the cells are approximately two inches long. With the actuation device in position, the end face 12 is parallel to the rear surface of the screen.

Mounted on the end face 13 is a miniature direct current electric motor 14. The field of the motor is provided by a permanent magnet, so that the direction of rotation of the motor is determined by the direction of the current flowing through the armature.

The shaft of the motor is coupled to worm and gear wheels, not shown, mounted within the body 11. The worm and gear wheels are arranged in this embodiment, to provide a reduction in speed in the ratio of 900:1 between the input shaft connected to motor 14 and both of two output shafts 15 and 16.

The shafts 15 and 16 emerge from the gearing body 11 through bearings in the centre of end face 12 and to one side of end face 13, with their axes perpendicular to the end faces.

Switch wafers 17 and 18, supported from the end face 13 of the body on four pillars 19, have bosses 20 and 21 of their wipers coupled to the output shaft 16. The switches are part of a circuit arrangement, which is described in greater detail later in the specification with reference to FIG. 2.

The actuating device is secured within a compartment of the panel by a retaining plate 22. The plate 22 is mounted on the surface of the display panel, using screws which pass through holes 23 in the retaining plate, through corresponding holes in the screen of the display panel and engage with tapped holes 24 in the end face 12 of the actuating device. Clearance holes are provided in the panel and retaining plate so that a movable part 26, visible from the front of the display panel, can be mounted on and fixed to the shaft 15.

The retaining plate 22 and movable part 26 are used to represent an element of the system diagrammatically displayed on the panel. Areas 25 and 25' of the plate, indicated in FIG. 1 by cross hatching, are painted to represent the cylinder and ports of an open/shut hydraulic valve, in this particular example. Corresponding areas 27 and 27' are painted on part 26 to represent the cock of the valve.

To represent the valve in the open postion the part 26 is positioned on the shaft 15 so that an unpainted area 28 of the part is in line with ports 29, 29', represented by unpainted areas on the plate 22. To represent the valve in a closed position, the shaft 15 is caused to rotate through an angle of approximately 90 degrees to bring areas 27 and 27' of the part 26 opposite to the ports 29 and 29'.

Referring to FIG. 2, the motor 14, the body 11, the switch wafers 17 and 18, the output shafts 15 and 16 and the movable part 26 of FIG. 1 are shown diagrammatically, using the same reference numbers as in FIG. 1. A shaft 53 of the motor 14 is coupled to the worm and gear wheels within the body 11.

Each switch wafer has 30 contacts, $K_1$ to $K_{30}$, spaced apart at angular intervals of 12 degrees, with wipers providing make-before-break operation between adjacent contacts. Eight contacts $K_1$ to $K_8$ of the switch wafers 17 and 18 are shown in FIG. 2, contacts $K_9$ to $K_{30}$ being omitted from the drawing for the sake of clarity.

Contacts $K_2$ to $K_7$ between contacts $K_1$ and $K_8$ of wafer 17, are joined together and to a terminal 40. Contact $K_1$ is connected to terminal 40, via a rectifier 41. Rectifier 41 is connected in a manner to allow current to flow through it when terminal 40 is connected to the positive pole of a source of direct current. Contact $K_8$ is connected to terminal 40, via a rectifier 42. Rectifier 42 is connected in a manner to allow current to flow through it when terminal 40 is connected to the negative pole of a source of direct current. Terminals 14' and 14" of the armature of the motor 14 are connected to a wiper 43 of the switch wafer 17 and to a terminal 49 respectively.

Terminal 40 is connected to a centre contact 45 of a two-position switch 44.

The switch 44 is associated with a control, not shown, which determines the operation of the valve. The control is part of the hydraulic system illustrated by the display panel in which the actuating device is incorporated.

Contact 46 of switch 44 is connected to the positive pole of a first source of direct current represented by terminal 47. Contact 46′ is connected to the negative pole of a second source of direct current represented by terminal 48. The negative and positive poles of the first and second sources respectively are connected together and to terminal 49.

Electric lamps 50 and 51 are connected to contacts $K_1$ and $K_8$ of switch wafer 18 and to terminal 49. Wiper 52 of the switch wafer 18 is connected to terminal 47 of the first source of current.

Assuming the switch 44 is in a position where contacts 45 and 46′ are joined together and that the bosses of wipers 43 and 52 are coupled to the shaft 16 so that the wipers rest on contacts $K_1$ of the switch wafers 17 and 18. Terminal 40 is connected by way of the closed contacts 45 and 46′ to the negative pole of the second source of current, the rectifier 41 is substantially non-conductive and the value of the current flowing through the armature of the motor 14 is negligible, hence the motor armature remains stationary.

Let the switch 44 be moved to a position where contacts 45 and 46 are joined together. Terminal 40 is connected by way of the closed contacts 45 and 46 to the positive pole of the first source of current, the rectifier 41 is then conductive, current from the first source flows through the armature of the motor from terminal 14′ to terminal 14″ to cause the armature to rotate in a direction to move wipers 43 and 52 from contacts $K_1$ towards contacts $K_8$. Current is supplied directly to the armature of the motor, from terminal 40, as the wiper passes over contacts $K_2$ to $K_7$ until the wiper 43 rests solely on contact $K_8$. The contacts 45 and 46 of the switch 44 are joined together, terminal 40 is connected to the positive pole of the first source of current, therefore, the rectifier 42 is substantially non-conductive. Hence no current flows through the armature of the motor and the shaft 16 becomes stationary.

Now let the switch 44 be moved to the position where contacts 45 and 46′ are joined together. The polarity of terminal 40 is such that the rectifier 42 is conductive, current from the second source now flows through the armature from terminal 14″ to 14′ to cause the armature to rotate in a direction to move wipers 43 and 52 from contacts $K_8$ towards contacts K. The contacts 45 and 46′ of the switch 44 are joined together, terminal 40 is connected to the negative pole of the second source of current, therefore, the rectifier 41 is nonconductive. Hence no current flows through the armature of the motor and the shaft 16 again becomes stationary.

Thus the shaft 16 is controlled to rotate, in clockwise or counter-clockwise directions, through an angle corresponding to the movement of wipers 43 and 52 over contacts $K_1$ to $K_8$, that is to say, through an angle of 84 degrees. The movements of the shaft 15, FIG. 1, are similar to those of shaft 16 and the part 26, mounted on shaft 16, is rotated in a manner to represent the opening and closing of the cock of the valve.

Assuming the part 26 to be orientated with respect to the retaining plate 22 to represent the valve in the open condition and the wipers 43 and 52 to be on contact $K_1$. The lamp 50, positioned in a compartment adjacent the actuator device, serves to illuminate an area painted to represent a pipe leading to the valve and thus to represent flow of hydraulic fluid to the valve. The lamp 51, positioned near to the control associated with the switch 44, glows if the wiper 52 is on contact $K_8$ and thus serves to indicate the condition where the valve is shut.

In the example described, the output shaft of the actuating device has an angle of movement of 84 degrees. An angle of movement of 12 degrees is provided by connecting the rectifiers 41 and 42 to adjacent switch contacts. Angles of movement between 24 degrees and 348 degrees may be provided by connecting the rectifiers 41 and 42 to contacts spaced apart so that any required number form from 1 to 20 contacts is included between them, the included contact or contacts being connected to the terminal 40.

In a further alternative embodiment, where angular movements with respect to a mid-position are required, two switch wafers are used, each with an associated pair of rectifiers.

What I claim is:

1. An actuating device for the operation of a movable part of a mechanized display panel comprising a reversible direct current electric motor, speed reduction means having an input shaft coupled to the motor and a first output shaft coupled to operate a movable part of a mechanized display panel, multiple-contact switching means having a rotor mechanically coupled to a second output shaft of the speed reduction means and electrically connected in circuit with the motor, first and second rectifiers oppositely sensed for current flow therethrough and respectively connected in series to first and second contacts and the intermediate contacts of the switching means, the two rectifiers and any intermediate contacts between said first and second contacts being together connectable selectively to either pole of a direct current source and selectively connectable in circuit with the motor by rotation of the rotor of the switching means, so that when the two rectifiers and the intermediate contacts are connected to the positive pole of the direct current source current will flow through the motor in one direction when any one of the first contact and the intermediate contact is closed but no current will flow through the motor when the second contact is closed, and when the two rectifiers and the intermediate contacts are connected to the negative pole of the direct current source current will flow through the motor in a direction opposite to said one direction when any one of the second contact and the intermediate contacts is closed but no current will flow through the motor when the first contact is closed, whereby the motor is automatically effective to rotate said input shaft and thereby the rotor of the switching means to close the contact which stops flow of current through the motor and the spacing between the first and second contacts determines the extent of possible movement of said movable part.

2. An actuating device as claimed in claim 1, in which the first and second output shafts move simultaneously and proportionately.

3. An actuating device as claimed in claim 1, in which the first output shaft is coupled to impart rotary movement to the movable part.

4. An actuating device as claimed in claim 1 in which the first output shaft is coupled through a link mechanism to impart a lateral movement to the movable part.

5. An actuating device as claimed in claim 1, having further multiple-contact switching means having a rotor coupled to one of said first and second output shafts, and connected selectively to energize a plurality of electric lamps according to the position of the said shaft.

6. An actuating device as claimed in claim 5, in which the electric lamps are of different colors.

References Cited by the Examiner

UNITED STATES PATENTS

| 1,744,821 | 1/1930 | Young | 318—256 |
| 2,755,423 | 7/1956 | Hager | 318—261 |
| 2,911,636 | 11/1959 | Brouse | 340—282 |
| 2,912,632 | 11/1959 | Turtil | 318—293 |

ORIS L. RADER, *Primary Examiner.*